United States Patent [19]
Cattaneo

[11] 4,359,229
[45] Nov. 16, 1982

[54] PISTON RINGS WITH CONTROL SLITS

[76] Inventor: Leopoldo Cattaneo, Via De Alessandri 1, 20144 Milano, Italy

[21] Appl. No.: 152,495

[22] Filed: May 22, 1980

[30] Foreign Application Priority Data

Jun. 1, 1979 [IT] Italy ................. 23192 A/79

[51] Int. Cl.³ ................................. F16J 9/12
[52] U.S. Cl. .................... 277/216; 277/225; 267/1.5
[58] Field of Search ............. 267/1.5; 277/216-224

[56] References Cited

U.S. PATENT DOCUMENTS

| 1,369,075 | 2/1921 | Ballman | 277/217 |
| 2,387,855 | 10/1945 | Phillips | 277/216 |

FOREIGN PATENT DOCUMENTS

| 613959 | 2/1961 | Canada | 277/216 |
| 653363 | 11/1928 | France | 277/225 |
| 400106 | 10/1933 | United Kingdom | 277/216 |

Primary Examiner—Robert S. Ward, Jr.
Attorney, Agent, or Firm—Steinberg & Raskin

[57] ABSTRACT

A piston ring is provided, on its support surfaces transversal to the movable member carrying said piston ring, with a plurality of relief means formed by slits and/or grooves distributed along said support surfaces.

12 Claims, 9 Drawing Figures

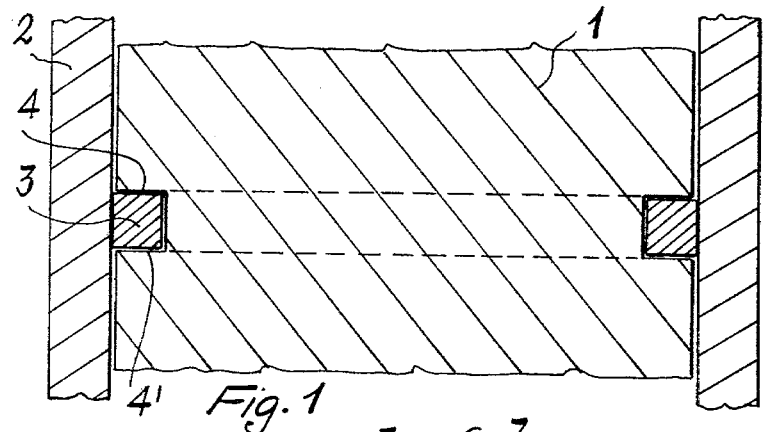
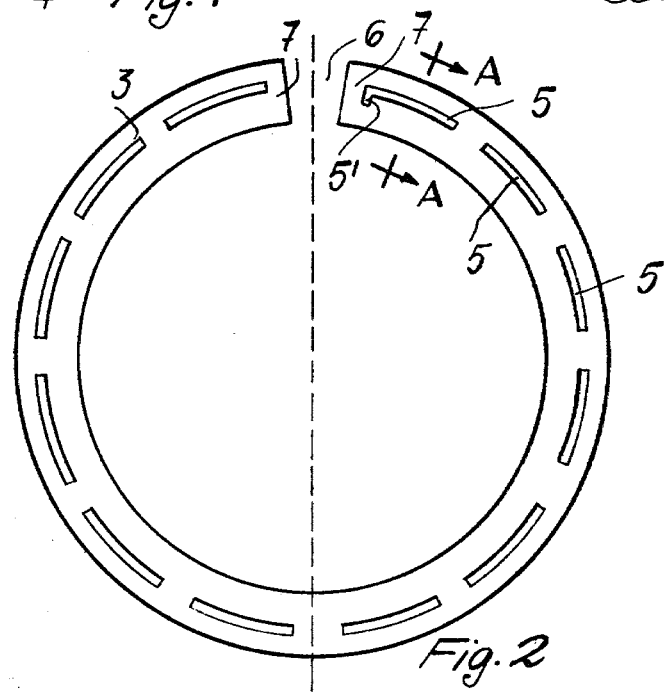
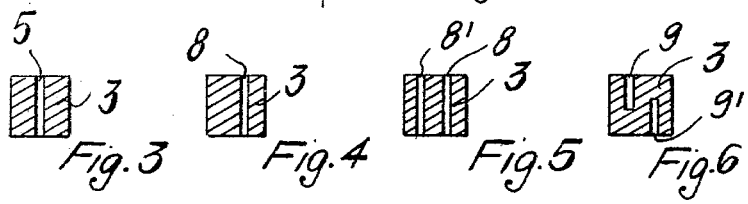

PISTON RINGS WITH CONTROL SLITS

The present invention relates to a piston ring having the desired peripheral rigidity yet adapted to have a controlled deformation during hot operation.

With the term 'piston ring' reference is hereinafter made to any type of elastic ring, including the oil-scraper ring, carried by a movable member (i.e. a piston) and adapted to engage a cylindrical surface (i.e. a cylinder liner), said piston ring being conventionally used in alternative motive engines (i.e. endothermic motors) and in alternative operative engines (i.e. pumps and compressors).

As known, one of the major difficulties encountered in obtaining a good seal between a piston ring and a cylindrical surface is due to the fact that the tips, i.e. the end portions of the piston ring defining the cut, do not exactly conform with the cylindrical surface when their outer bending radius does not exactly correspond to the bending radius of said cylindrical surface. Such lack of correspondence is usually due to the fact that both the cylinder liner and the piston ring, after some hundred hours of operation, become worn and are subjected to local ovalizations, i.e. deformations, compensated for only along a wide arc a good portion of which does not engage to the cylinder liner and, therefore, is not tight. This facilitates the collapsing of the piston ring and consequent blow-by of the operating fluids.

This drawback is very serious for the endothermic motors and is particularly prevalent in the first piston ring and in the oil-scraper ring.

With respect to the first piston ring, the so-called flame damper effect is diminished to a large extent since the external gas pressure acting, during the combustion, on that portion of the piston ring defining a gap with the cylinder liner hastens, near the the top dead center of the stroke, the formation of a further opening of said gap between the piston ring and the cylinder liner. This is due to the clearance of the tips described above and is increased by the ovalizations both of the cylinder liner and of the piston ring. Obviously, the engine is severely damaged by the wear caused by and combined with the flame blow-by between liner and piston ring.

With respect to the oil-scraper ring, in the ovalized and/or worn out area the tight seal between the piston liner and piston ring is destroyed with a consequent passage and burning of oil.

Further to the above, it should be pointed out that the flame blow-by and oil passage drawback is further aggrevated by the fact that, for example, in a cylinder liner having a diameter of 100 mm. the expansion difference, between a cold and hot engine, of the mean fiber of the liner and ring is, in the upper portion of said liner, about 0.06–0.10 mm. while, in the lower portion of the same liner, said difference can also be about 0.14 mm. It should also be kept in mind that in endothermic motors the inner portion of the piston ring has a temperature lower than that of the outer portion since the latter is in contact with the cylinder liner which is usually cooled, so that the bending radius on the tips, in the example of a cylinder liner having a diameter of 100 mm., is further increased between 0.1 and 0.3 mm.

From the above the necessity of making the piston ring, and in particular its tip portions, as flexible as possible is apparent.

The object of the present invention is to provide a piston ring suitably constituted (a) for avoiding flame blows-by and oil passage between the cylinder liner and the ring and (b) for controlling the temperature distribution along the radial thickness of the piston ring and, if necessary, also along the periphery of the same ring.

The piston ring, according to the invention, is suitable for use on a movable member, such as a piston, and operates on a cylindrical surface, such as a cylinder liner, said piston ring being employed in alternative motive and operative engines and comprises a first support surface resting on a first side of a groove circumferentially provided in said movable member and a second support surface resting on a second and opposite side of said groove, said first and second sides being transversally disposed relative to said movable member and is essentially characterized in that on said support surfaces a plurality of relief means is provided.

One way for carrying out the invention is described in detail below with reference to the drawings which illustrate only some specific embodiments, in which:

FIG. 1 is a diagrammatic cross section showing a piston mounted in a cylinder liner and provided with a piston ring according to the invention;

FIG. 2 is a plan view of one embodiment of a piston ring according to the invention;

FIGS. 3, 4, 5 and 6 are sectional views respectively taken along the lines A—A, of FIG. 2 and B—B, C—C and D—D of FIGS. 2a, 2b and 2c.

Figure 2A:
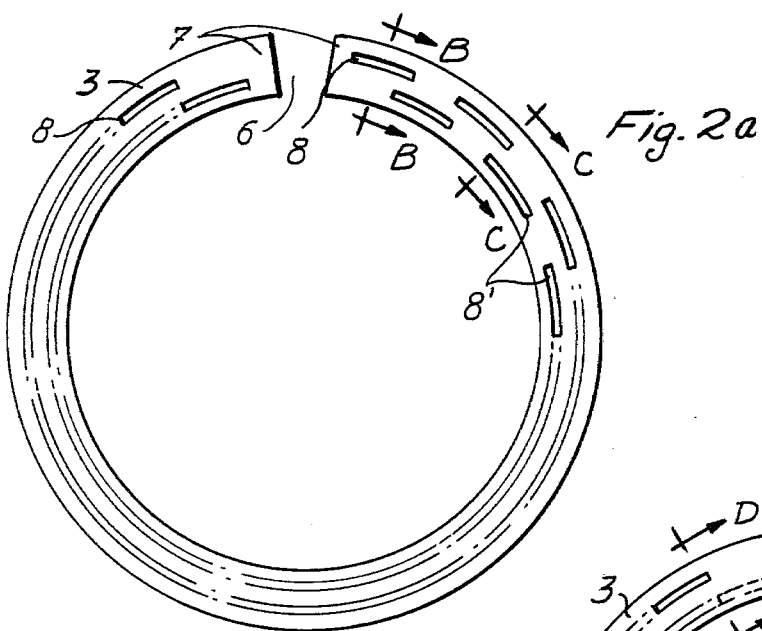
FIGS. 2a–2c are plan views of three additional embodiments of the invention respectively.

With reference to FIG. 1, a piston 1, alternatively movable within and along an endothermic motor cylinder liner 2, has a circumferentially disposed groove for conventionally seating a piston ring 3. Said groove has two opposed sides 4 and 4', transversal to the piston 1, for supporting said ring 3.

Referring to FIG. 1, slits 5 are formed which pass through the axial thickness of the piston ring 3, said slits being arranged in a single row perpendicular to the piston ring plane and concentric with the liner 2. The slit 5 nearest to the cut 6 of the piston ring 3 is also provided with a slit 5' parallel to said cut for obtaining a maximum flexibility at the tips 7, wherein the adaptability capacity is the least.

Referring to FIG. 2a, slits 8 and 8', also passing through the axial thickness of the piston ring 3, are provided in two rows, the slits of one row being offset relative to the slits of the other row.

Figure 2B:
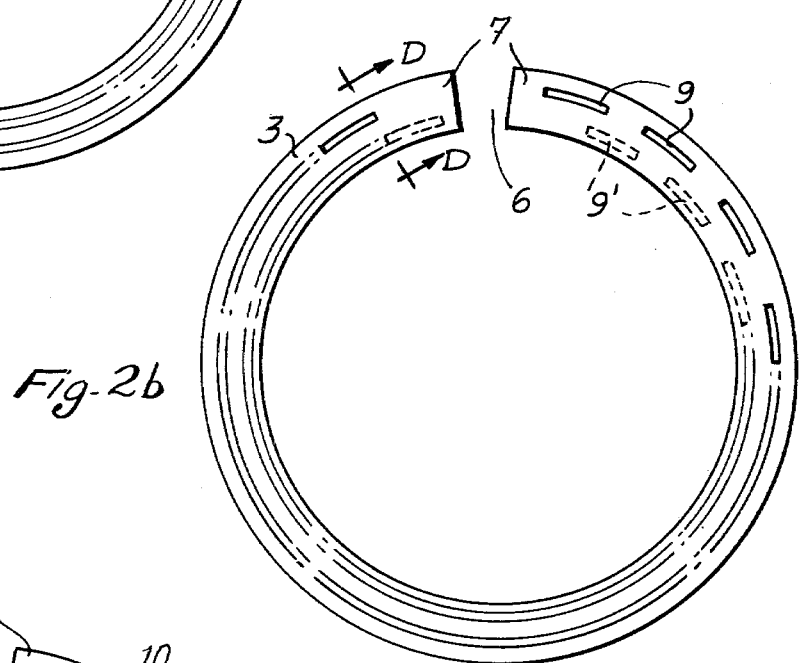

Referring to FIG. 2b, grooves 9, which do not pass through the axial thickness of the piston ring, are provided on a first surface of said piston ring and grooves 9' are provided on the second and opposite surface of the same ring. In the embodiment shown, the grooves 9 and 9' are radially offset one with respect to the other.

Figure 2C:
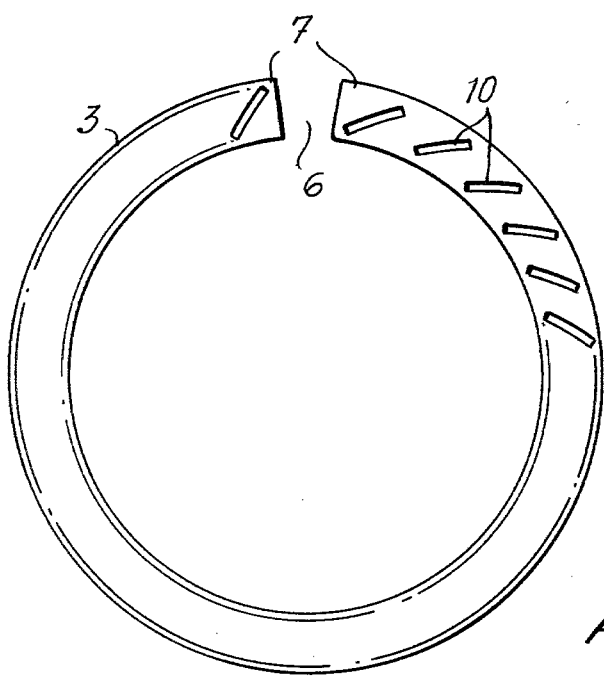

Referring to FIG. 2c through slits or grooves 10 are provided, the latter not passing completely through the thickness of the piston ring. The slits and grooves have any desired inclination.

The various slits and/or grooves can be obtained in any desired manner, for example:

(a) by boring holes or milling with a mechanical tool through the piston ring surfaces so as to obtain the desired slits and/or grooves;

(b) by removing material for obtaining the slits and/or grooves by means of an electronic or laser beam or by means of electroerosion;

(c) by making the piston ring by sintering or sinter-forging and by inserting into the mold non-sintering blades or sweeps, said blades or sweeps being also in a material which can be eliminated, for example, by oxidation or by means of solvents;

(d) by combining by means of superimposition and/or winding a plurality of elements already provided with the desired slits and/or grooves and by welding or brazing the various elements to obtain a cylinder having the same height as the axial thickness of the piston ring or having any desired axial length so that the so obtained cylinder can be cut in several pieces having a thickness corresponding to the axial thickness of the piston ring.

It should be noted, however, that the manner for obtaining the various slits and/or grooves is irrelevant and is not within the scope of the present invention, the essence of which is to provide a piston ring having slits and/or grooves so conformed and disposed as to obtain a different elastic behaviour, i.e. a higher and controlled flexibility, of the piston ring at different points thereof; a different flow of the heat transmission from the inner to the outer part of the piston ring; and a controlled engagement of the piston ring with the liner in the different phases which said piston ring undergoes.

The slits and/or grooves will be calculated with such dimensions so that the vibrations (radial, axial and torsional) both of the piston ring and of the relief means are always out of synchronism with the harmonics of whatever order of the cycle diagram when the energy generated by said harmonics overcome the damping capacity of the piston ring or of the considered portion of said piston ring.

What I claim is:

1. A piston ring suitable for use on a movable member, such as a piston, operating on a cylindrical surface, such as a cylinder liner, said piston ring having a first support surface resting on a first side of a groove circumferentially provided in the movable member and a second support surface resting on a second and opposite side of said groove, said first and second sides being transversally disposed relative to said movable member, said piston ring comprising a plurality of control means on said support surfaces and axially disposed relative to the thickness of said piston ring for simultaneously controlling elastic and thermal deformations of said ring and heat flowing across said ring in various positions of said ring assumed during motion thereof.

2. A piston ring as claimed in claim 1, wherein said control means constitute slits passing through the axial thickness of said piston ring.

3. A piston ring as claimed in claim 2, wherein said slits are distributed in a plurality of rows along the radial thickness of said piston ring.

4. A piston ring as claimed in claim 3, wherein the slits of one row are offset relative to the slits of the adjacent row.

5. A piston ring as claimed in claim 1, wherein said relief means are formed by at least one row of slits passing through the axial thickness of said piston ring and having a differently inclined course and a differentiated width.

6. A piston ring as claimed in claim 5, wherein said slits having a differently inclined course have generatrixes parallel to the axis of said cylindrical surface.

7. A piston ring as claimed in claim 1, wherein said relief means for formed by grooves provided on at least one of said first and second support surfaces.

8. A piston ring as claimed in claim 1, wherein grooves are provided on both said support surfaces, the grooves on one support surface being radially offset relative to the grooves on the other support surface.

9. A piston ring as claimed in claim 1, wherein said control means constitute holes formed through said ring.

10. A piston ring as claimed in claim 1, wherein said control means constitute slits in said support surfaces of said ring.

11. A piston ring as claimed in claim 1, wherein said control means constitute slits extending transversely to radii of said ring.

12. A piston ring as claimed in claim 1, wherein said control means constitute slits extending substantially perpendicularly to the planes of said support surfaces of said ring.

* * * * *